Sept. 1, 1970  E. K. GLIDER ET AL  3,526,794

ROTOR OF AN ELECTRIC MACHINE WITH EVAPORATIVE COOLING

Filed July 2, 1968  2 Sheets-Sheet 1

Sept. 1, 1970   E. K. GLIDER ET AL   3,526,794
ROTOR OF AN ELECTRIC MACHINE WITH EVAPORATIVE COOLING
Filed July 2, 1968   2 Sheets-Sheet 2

United States Patent Office 3,526,794
Patented Sept. 1, 1970

3,526,794
ROTOR OF AN ELECTRIC MACHINE WITH EVAPORATIVE COOLING
Evgeny Khaimovich Glider, Prosp. Ordzhonikidze 18, kv. 55; Oleg Borisovich Gradov, Ulitsa Kosiora 6, kv. 1; David Bentsionovich Karpman, Ulitsa Frantisheka Krala 49, kv. 54; Boris Leonidovich Konovalov, Ulitsa 12 Aprelya 10, kv. 16; Boris Volikovich Spivak, Ulitsa Kosiora 56, kv. 55; Alexandr Abramovich Chigirinsky, Ulitsa Kuibysheva 11, kv. 8; Nikolai Grigorievich Grinchenko, Ulitsa Vatutina 16/25; Lazar Yangelevich Stanislavsky, Ulitsa Mayakovskogo 11, kv. 24; Vasily Semenovich Kildishev, Ulitsa Plekhanovskaya 41/43, kv. 55; and Vladimir Grigorievich Danko, Bulvar Ivana Karkacha 2, kv. 71, all of Kharkov, U.S.S.R.; and Valentin Fedorovich Vorobiev, Ulitsa Scherbakovskaya 40/42, kv. 252; Eduard Valentinovich Barbashev, Ulitsa Godovikova 2, kv. 103; and Ljubov Alexandrovna Juditskaya, Stoleshnikov pereulok 14, kv. 10, all of Moscow, U.S.S.R.
Filed July 2, 1968, Ser. No. 741,976
Int. Cl. H02k 9/20
U.S. Cl. 310—54   2 Claims

ABSTRACT OF THE DISCLOSURE

An electric machine with an evaporative cooling system of the winding thereof comprises a rotor having a hollow shaft through which liquid coolant is supplied to a circular coolant header sealingly fitted over the shaft and having an annular space through which liquid coolant flows to axial ducts in the shaft leading to the winding of the rotor. A projection is located between the ducts and the annular space to overlap part of the cross-sectional area of the ducts to regulate flow of coolant from the space to the ducts.

---

The present invention relates to electric machines and more particularly to the rotors of electric machines with evaporative cooling.

Known in the art are rotors of electric machines, with a liquid-cooled winding which is made of hollow conductors, whereto liquid coolant is supplied by way of axial passages or ducts and a circular cooling header set on the shaft of the machine and having a space filled with the coolant supplied through the bore in the machine shaft.

A disadvantage inherent in such a design of the evaporation-cooled rotor resides in the failure to evenly distribute liquid coolant among all the coolant-inlet ducts or channels. As a rule, only part of the clear area of said ducts or channels should be filled with liquid coolant in the case of evaporative cooling.

There are likewise known evaporation-cooled rotors of electric machines featuring a device for supplying liquid coolant, wherein to receive a free flow of liquid coolant, an auxiliary cylinder with limiting shoulders is provided, said cylinder being set on the shaft of the machine.

This construction suffers from the disadvantages that the rotor is not liquid-tight and that a coolant supply tube is provided between rotating parts.

It is an object of the present invention to eliminate the disadvantages mentioned above.

It is a specific object of the present invention to provide such a rotor of an electric machine which is instrumental in obtaining a controlled and proportioned supply of liquid coolant to the inlet ducts or passages, the rotor itself being absolutely liquid-tight, whereby evaporative cooling system can be employed.

According to the invention, the above objects are accomplished due to the fact that in the rotor of the electric machine with the evaporation-cooled winding thereof, liquid coolant is supplied by way of axial ducts or channels and a circular cooling header fitted on the machine shaft, the header having a space partly filled with liquid coolant supplied through the bore in said shaft, a projection being located between said axial ducts or passages and said circular space so as to bound the latter and overlap part of the clear area of the axial ducts or passages.

It is expedient that an annular partition with axial holes be mounted in said circular space to divide the latter into two hydraulically intercommunicating portions.

The application of the herein-proposed rotor of an electric machine with liquid-evaporation cooling makes it possible to provide a liquid-tight system of proportioned supply of liquid coolant to the rotor, while allowing the rotor to rotate in a gaseous medium at any pressure thereof (e.g. in a hydrogen medium in the case of a turbogenerator). The implementation of the herein-disclosed construction into practice needs no additional investigation or research, nor does it require the development of any experimental models or test specimens.

The invention is described in greater detail with respect to a few embodiments thereof given by way of example with due reference to the accompanying drawing, wherein.

Figure 1:
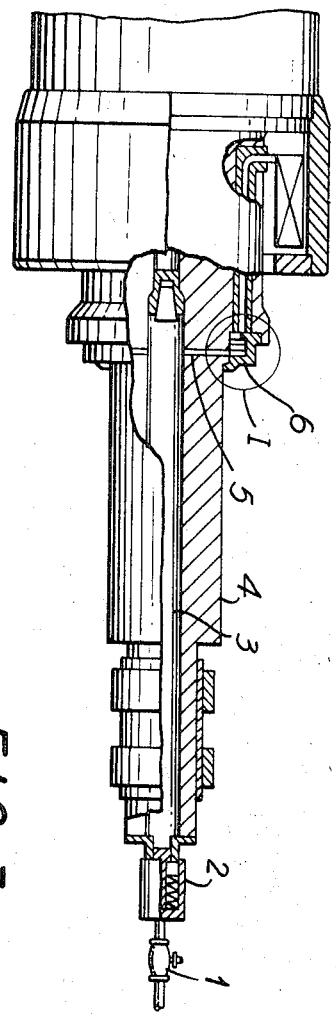
FIG. 1 is a side view, partly broken away and in section of the rotor according to the invention.
Figure 2:
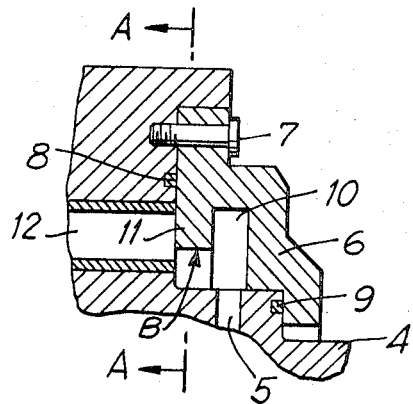
FIG. 2 is a sectional view of a portion of the rotor according to a first embodiment of the invention.
Figure 4:
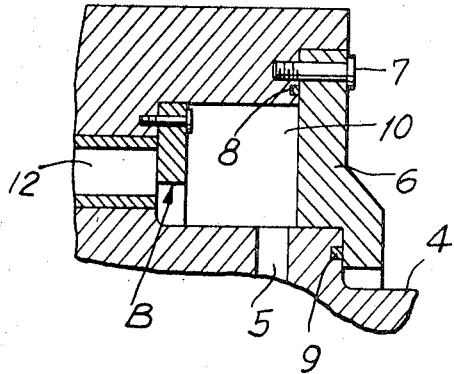
FIG. 4 is a sectional view of the same portion of the rotor according to a second embodiment of the invention.
Figure 5:
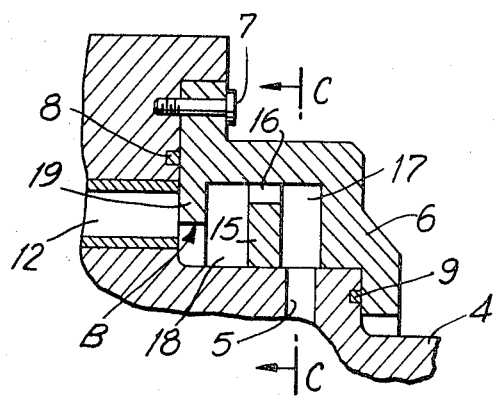
FIG. 5 is a sectional view of the same portion of the rotor according to a third embodiment of the invention.

Now referring to FIG. 1, the construction of the rotor with a liquid-evaporation cooling system according to the invention, comprises: a device 1 to control the flow rate of liquid coolant and, a sealing device 2, whereby liquid coolant is supplied to a central hole 3 of a rotor 4 and thence, via radial ducts or channels 5 in the rotor 4 liquid coolant is supplied to a proportioning device 6 which, for all the embodiments considered herein, is mounted on the shaft of the rotor 4 and fastened thereto with bolts 7 (FIGS. 2, 4, 5). The device 6 is sealed with circular rubber joints 8 and 9.

Figure 6:
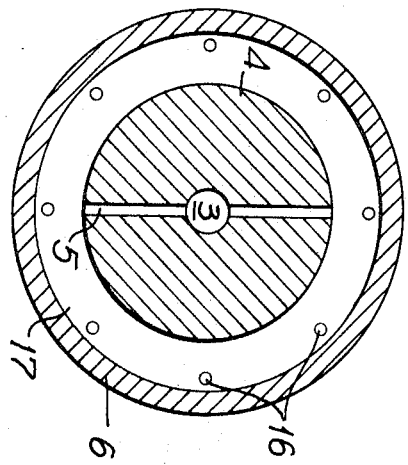
FIG. 6 is a section taken on the line C—C of FIG. 5.
Figure 3:
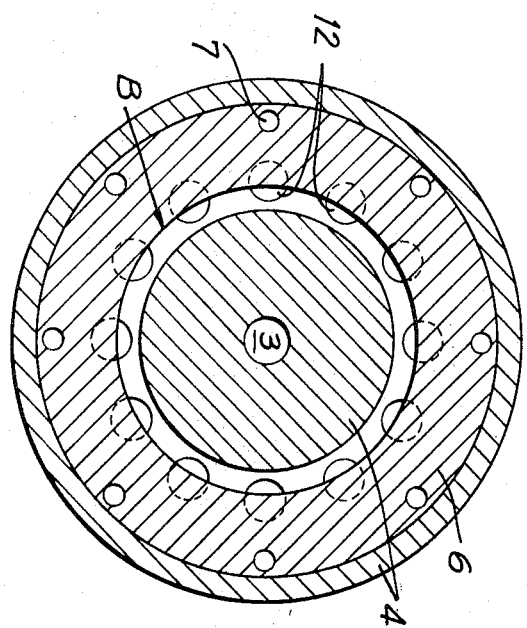
FIG. 3 is a section taken on the line A—A of FIG. 2.

The proportioning device 6 shown in FIGS. 2 and 3 incorporates an airtight annular space 10 and a proportioning projection 11 which overlaps axial intake ducts or channels 12 adapted to supply liquid coolant to the rotor winding, the overlapped area of said ducts being equal to the value of possible offset of said ducts from their normal position, i.e. the area B of the proportioning projection 11 has a minimum gyration radius as compared to any point on the surface of liquid flowing through the ducts 12. In case the intake ducts 12 are in an accurate register with the rotational axis of the rotor, or when the cooling system involved does not require an accurate proportioning of liquid coolant, the proportioning projection 11 need not be made overlapping with respect to said intake ducts.

The proportioning device 6 employed in the embodiment of FIG. 4 differs from that in FIGS. 2 and 3 in that a ring 13 is employed to serve the purpose of the proportioning device 11, said ring being made fast on the rotor 4 by means of screws 14.

The proportioning device 6 in the embodiment of the invention in FIG. 5 features an annular partition 15 provided with axial holes 16 and adapted to divide the annular space 10 into two portions, viz. a damping chamber 17 and a distribution chamber 18. Liquid coolant flows through the radial holes 5 in the rotor 4 to the damping chamber 17, thence it passes, via the axial holes 16 to the distribution chamber 18 and further on, via a projection 19 playing the part of the proportioning projection 11, to the intake ducts 12.

The process of supplying liquid coolant to the rotor 4 and its proportioned distribution among the intake ducts 12 is as follows. Liquid coolant is supplied via the flow rate control device 1 which is adapted to regulate the total rate of flow of liquid coolant used in the evaporative cooling system of the rotor, next through the sealing device 2, the central hole 3 and the radial ducts 5 to enter the airtight annular space 10, wherein the coolant is caused to spread over the inner surface of said space due to the effect of centrifugal forces, the layer of the spread coolant being somewhat irregular. This is explained by the fact that, when a single chamber cooling system is employed in the embodiments of FIGS. 2 and 4, the coolant is continuously supplied from the radial holes 5 to certain points of the annular space and the flow rate of the coolant in said ducts can be rather different due to the sluggishness of the liquid, as well as due to its spattering. The above disadvantage is eliminated in the embodiment of FIG. 5 by the provision of the damping chamber 17 which is adapted to hydraulically communicate with the distribution chamber 18 through the axial holes equidistantly spaced around the periphery of the annular partition 15, due to which arrangement no effect of the liquid sluggishness or spattering in the distribution chamber 18 occurs.

Liquid coolant always fills the distribution chambers in all the systems embodied herein up to the level of the area B of the proportioning projection, whereas the surplus liquid overflows immediately from the distribution chamber to the intake ducts 12, the amount of liquid supplied to the ducts 12 being always the same due to the constant overflow level. The intake ducts 12 may be somewhat offset from their normal position and to provide a proper liquid proportioning under such condition, part of the inlet cross-sectional area of the ducts 12 is overlapped by the proportioning shoulder; it is expedient that one half of the area of said intake ducts be overlapped.

The intake ducts 12 may be in any desired number; moreover, by appropriately offsetting the ducts with respect to the area B of the proportioning shoulder, there can be obtained different and preset rates of flow of liquid coolant for various objects to be cooled.

What is claimed is:

1. A rotor of an electric machine with an evaporative cooling system of the winding thereof, said rotor comprising: a hollow shaft having a bore through which liquid coolant is supplied; a circular coolant header sealingly fitted over said shaft; said header being provided with an annular space in communication with said bore for being partly filled with liquid coolant; axial ducts arranged in said shaft for flow of liquid coolant from said header to the winding of said rotor which is made of hollow conductors; and projection means located between said axial ducts and said annular space to overlap part of the cross-sectional area of said axial ducts for regulating flow of coolant from the header to said ducts.

2. A rotor as claimed in claim 1 comprising an annular partition with axial holes mounted in said annular space to divide said space into two hydraulically intercommunicating chambers.

References Cited
UNITED STATES PATENTS

| | | | |
|---|---|---|---|
| 3,046,424 | 7/1962 | Tudge | 310—64 X |
| 3,097,317 | 7/1963 | Fechheimer | 310—54 |
| 3,189,769 | 6/1965 | Willyoung | 310—54 X |

DONOVAN F. DUGGAN, Primary Examiner

U.S. Cl. X.R.

310—61